United States Patent [19]
Harbaugh

[11] Patent Number: 5,584,588
[45] Date of Patent: Dec. 17, 1996

[54] COMPUTER KEYBOARD LAYOUT

[76] Inventor: Gary B. Harbaugh, 4233 Violet, St. Clair, Mich. 48079

[21] Appl. No.: 426,063

[22] Filed: Apr. 21, 1995

[51] Int. Cl.$^6$ ....................................................... B41J 5/10
[52] U.S. Cl. ............................................ 400/486; 400/489
[58] Field of Search .................................... 400/486, 489; 341/22; 345/168

[56] References Cited

U.S. PATENT DOCUMENTS

| | | | |
|---|---|---|---|
| 2,040,248 | 5/1936 | Dvorak et al. | 197/100 |
| 3,970,185 | 7/1976 | Shelton | 400/482 |
| 4,074,261 | 2/1978 | van der Gaag | 340/365 |
| 4,332,493 | 6/1982 | Einbinder | 400/484 |
| 4,519,721 | 5/1985 | Gardner | 400/472 |
| 4,522,518 | 6/1985 | Schmidt | 400/489 |
| 4,669,903 | 6/1987 | Herzog et al. | 400/489 |
| 4,963,044 | 10/1990 | Warner | 400/486 |
| 4,974,183 | 11/1990 | Miller | 400/486 |
| 5,170,348 | 12/1992 | Hirose | 400/489 |
| 5,294,782 | 3/1994 | Kumar | 400/486 |

FOREIGN PATENT DOCUMENTS 2517555  11/1976  Germany ............................... 400/486

OTHER PUBLICATIONS

J. Noyes, "The QWERTY keyboard: a review," J. Man-Machine Studies, issued 1983, vol. 18, pp. 265–281.
S. E. Michaels, "Qwerty Versus Alphabetic Keyboards as a Function of Typing Skill," Human Factors, issued 1971, pp. 419–426.
J. S. Greenstein, et al. "Keyboards," Input Devices, issued 1988, pp. 123–178.
R. S. Hirsch, "Effects of Standard Versus Alphabetical Keyboard Formats on Typing Performance," issued 1970, vol. 54, pp. 484–490.
Advertisement pamphlet, Smith Premier Complete Keyboard, The Smith Premier Typewriter Co., Inc., Form 371, entire document.

Primary Examiner—Edgar S. Burr
Assistant Examiner—Daniel J. Colilla
Attorney, Agent, or Firm—Allan H. Fried

[57] ABSTRACT

Computer keyboard with the alphabetic keys in a specified arrangement and in straight rows and columns.

1 Claim, 2 Drawing Sheets

COMPUTER KEYBOARD LAYOUT

FIELD OF THE INVENTION

This invention relates to keyboards used to input data from an operator into a computer or other data processing device, and in particular, to an improved layout for such keyboards.

BACKGROUND

The standard data entry keyboard used to input data into a computer is based on the "QWERTY" layout developed over 100 years ago for the manual typewriter. The alphabetic keys, numeric keys and most punctuation keys are laid out essentially the same as they were over 100 years ago. This layout has no particular logic to it in terms of the sequence of the keys other than to keep the keys from jamming from being struck too fast. This was useful in the days of mechanical typewriters which depended on levers causing arms with letters forged on them to swing up from their resting positions and strike an inked ribbon against the typing paper.

Another feature of the keyboard layout which was necessitated by the mechanical nature of typewriters was the offsetting of the keys from one row to the next so the levers would be evenly spaced. It can be easily observed that it is easier to learn to use a standard 10-key calculator keyboard than a "QWERTY" keyboard in part because the keys lie in both straight rows and straight columns. In moving from one number to another on the calculator, one only has to move straight up (away from the user) and/or straight down (toward the user) rather than consider various diagonal movements as one does when typing on a standard QWERTY keyboard.

The home row on a keyboard is the row normally recommended for initial placement of the fingers of both hands other than the thumbs. On the QWERTY keyboard the row starting with the letter A is the home row. For most of the keys in a QWERTY keyboard one normally reaches a bit to the left when striking a key in the row above the home row and a bit to the right when striking a key in the row below the home row. These movements tend to be somewhat awkward, especially for the left hand because the striking finger tends to run into the finger next to it.

Because a modern keyboard uses electrical signals from switches and not mechanical levers there is no need to use an awkward layout wherein the keys are not arranged in straight rows and straight columns.

About 20 years ago, most people who used a keyboard held clerical or secretarial positions and spent a great deal of time perfecting their keyboard skills and practicing them. Today, and in the future, millions of people who are not skilled keyboard users are nevertheless using them in one or more aspects of their life, and will continue to do so in seemingly ever greater numbers. Even very young children today are harnessing the power of computers for schoolwork, entertainment and other uses. There is therefore a need for a more logical keyboard layout which will make learning easier, overcome the shortcomings of the "QWERTY" layout and speed the work of the skillful keyboard user.

Others have proposed many possible alternatives but none has successfully replaced QWERTY as the standard. Dvorak and Dealy U.S. Pat. No. 2,040,248 detailed many of the problems of the "QWERTY" layout and proposed a solution. Their pioneering work antedated the invention of the computer and so is still tied to the old mechanical typewriter. They did point out that the speed of a typist is tied closely to the relative position on the keyboard of the keys of two-letter combinations which make up the words being typed. Faster typing, they observed, is possible when one alternates hands to successively strike different keys and slowest when typing using the same finger to successively strike two different keys.

It has been noted that the QWERTY keyboard puts the greater portion of typing most words in English predominantly on the left hand. This is disadvantageous because most people are right-handed and would be expected to type better if a greater portion of typing were done with the right hand.

BRIEF SUMMARY OF THE INVENTION

Computer keyboard with the alphabetic keys in a specified arrangement and in straight rows and columns.

DETAILED DESCRIPTION

Figure 1:
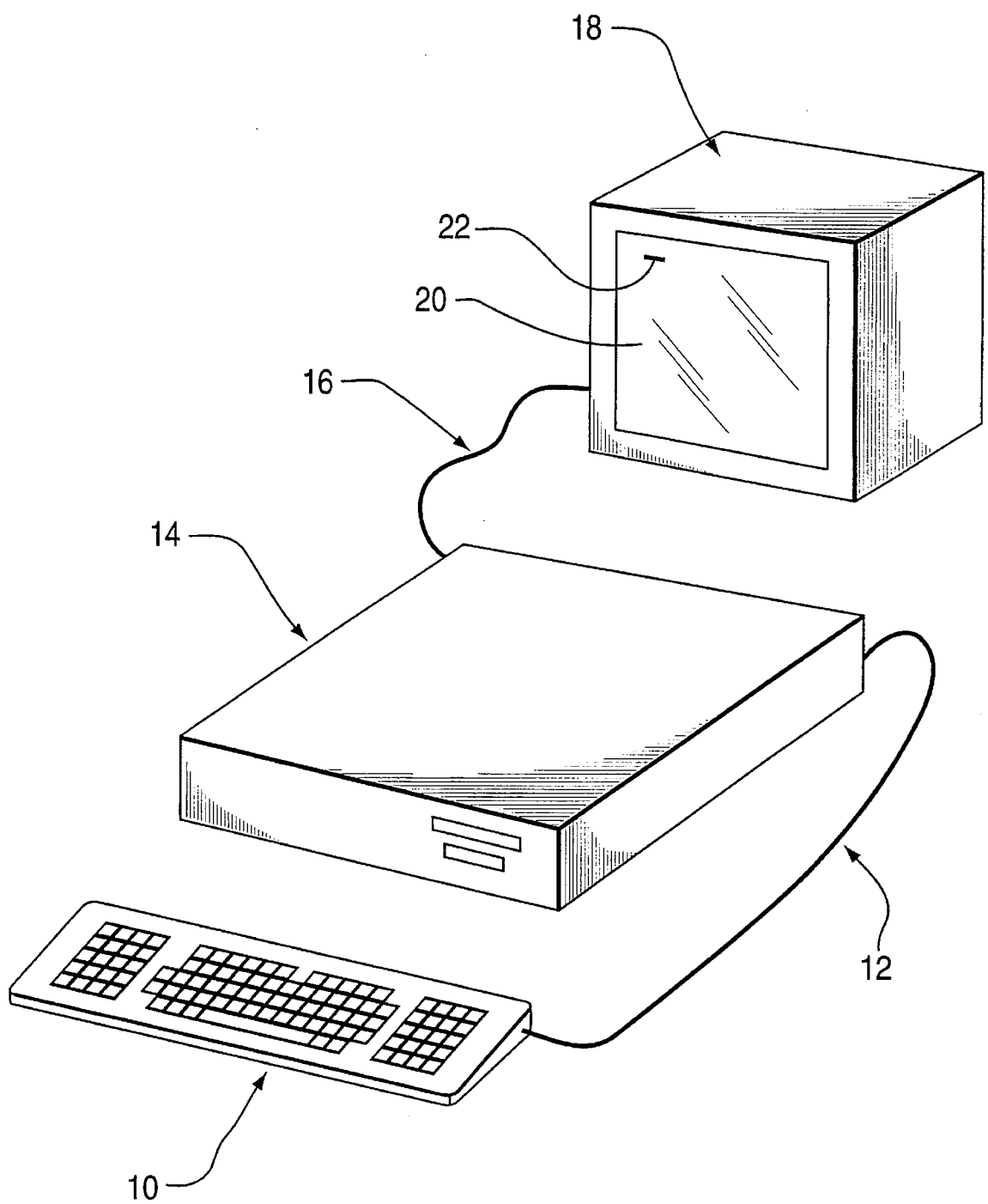
FIG. 1. Keyboard, computer, and monitor.

In a general aspect, the invention is a computer keyboard comprising 26 alphabetic keys, such that for each of the 26 letters of the alphabet there is one key, and seven nonalphabetic keys, such that in a straight first alphabetic key row there are from left to fight (relative to the normal position of the user), in sequence, keys for the letters, Q, M, N, O, and P, a first nonalphabetic key, a second nonalphabetic key, and keys for the letters, A, B, C, and D, such that, in a straight second alphabetic key row closer to the user than the first alphabetic key row and adjacent to the first alphabetic key row, there are from left-to-right, in sequence, keys for the letters, R, S, T, and U, a third nonalphabetic key, a fourth nonalphabetic key, a filch nonalphabetic key, and keys for the letters, E, F, G, and H, such that, in a straight third alphabetic key row closer to the user than the second alphabetic key row and adjacent to the second alphabetic key row, there are from left to right, in sequence, keys for the letters, V, W, X, Y, and Z, a sixth nonalphabetic key, a seventh nonalphabetic key, and keys for the letters, I, J, K, and L, wherein the first alphabetic key row is parallel to both the second and third alphabetic key rows, wherein said 26 alphabetic keys for letters and seven nonalphabetic keys together are organized in 11 straight columns of three keys each at right angles to the first, second and third alphabetic key rows, wherein the alphabetic keys for the letters Q, R, and V, are aligned in a straight column (i.e., straight line) at right angles to the first key row.

In a particular embodiment of the keyboard of the invention, the first nonalphabetic key is for moving a screen cursor on a computer monitor screen in an upward direction, the third nonalphabetic key is for moving the screen cursor in a leftward direction, the fifth nonalphabetic key is for moving the screen cursor in a rightward direction, and the sixth nonalphabetic key is for moving the screen cursor in a downward direction.

The fourth nonalphabetic key is preferably for activating a "Home" key of a computer. The Home key is one that is used, in a sequence of key strokes or alone, to move a cursor to the top or bottom line of text on a monitor screen.

In a preferred embodiment, the first alphabetic key row is further extended in a rightward direction after a separation distance (preferably equal to two keys) to include from left to right, in sequence, keys for the numbers, 7, 8, and 9, the second alphabetic key row is further extended in a rightward direction after the separation distance to include from left to right, in sequence, keys for the numbers, 4, 5, and 6, the third alphabetic key row is further extended in a rightward direction after the separation distance to include from left to right, in sequence, keys for the numbers, 1, 2, and 3, wherein a key for the number zero is adjacent to the key for the number 1, so as to make a column with the keys for 7, 4, 1, and 0, at right angles to the three alphabetic key rows.

The construction of the keyboard including its electronic components can be accomplished by well-known methods. In keeping with the design of most current keyboards, the alphabetic key rows will either all be in the same plane or, alternatively, the each row will be slightly elevated relative to the adjacent alphabetic key row closer to the user.

FIG. 1 shows a computer keyboard (10) connected by an electrical connector (12) to a computer (14) that is also connected by an electrical connector (16) to a computer monitor (18). The screen (20) and a cursor (22; enlarged for purposes of illustration) on the screen are also shown.

Figure 2:
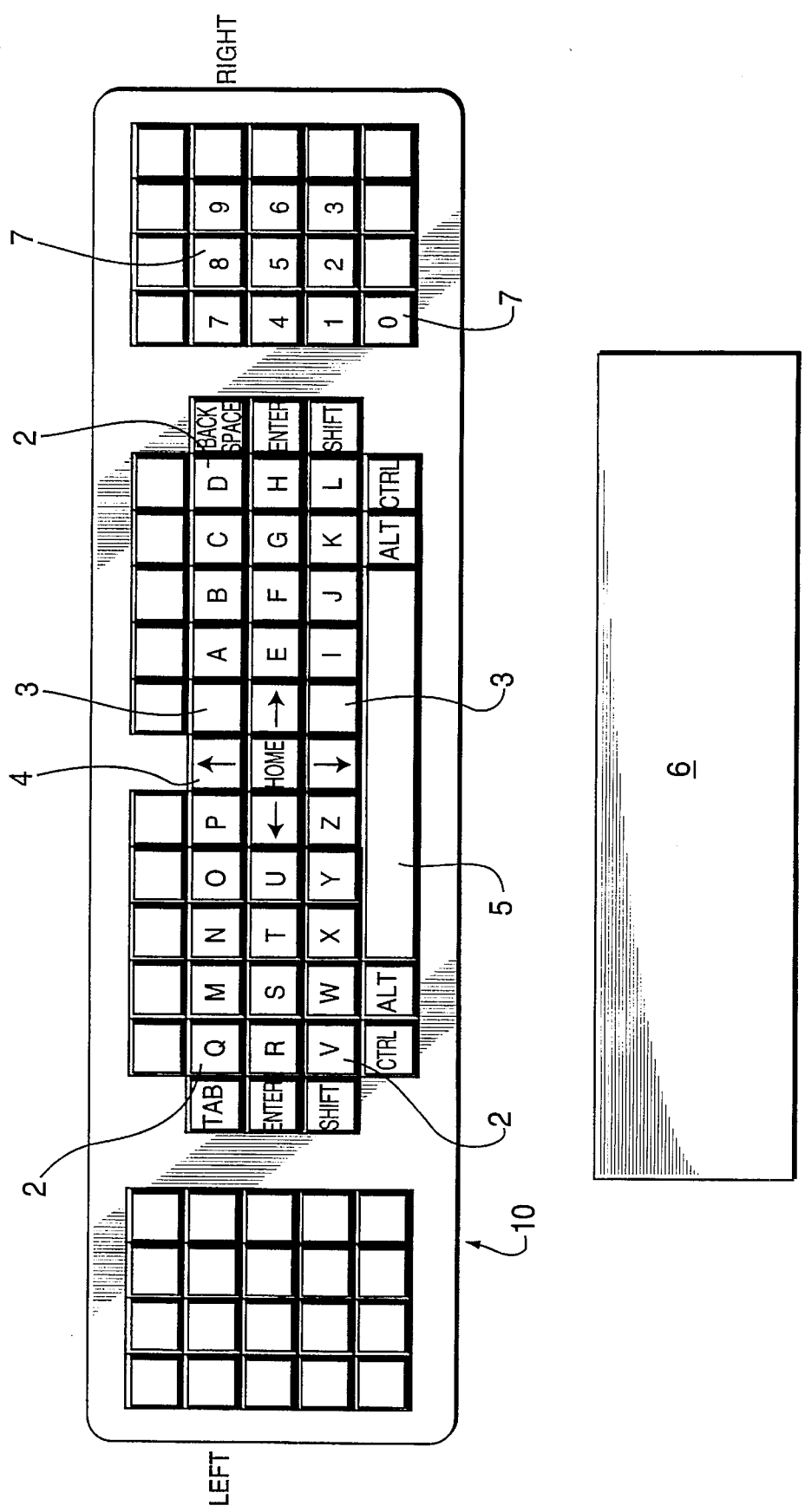
FIG. 2. Arrangement of the keys in a particular embodiment of the invention

FIG. 2 shows a particular embodiment of the keyboard. An area (6) occupied by the user is indicated by a rectangle. The area may be relatively more distant from the keyboard than is shown in the drawing. The purpose of the rectangle is to further illustrate why the "LEFT" and "RIGHT" positions are as indicated in the figure. The "LEFT" and "RIGHT" positions are the sides of the keyboard in relation to the user when the letters are correctly positioned for reading by the user.

The center-to-center distance between keys is preferably 19 mm. As a result the center-to-center distance between the Q and D keys is preferably 190 mm. The top surface of the keys may be any preferred shape, such as a square shape, and may be flat or curved. It is preferred that all 26 alphabetic keys and all seven nonalphabetic keys are the same size.

The alphabetic keys (2) are marked by the letters of the alphabet and in a few representative cases (for the letters, Q, D, and V) by the number, 2. There are four nonalphabetic keys with an arrow; one is denoted with the number, 4. There is one nonalphabetic key with the word "Home" on it. Two nonalphabetic keys without a marking on their surface are denoted with the number 3. All the other keys without markings on them may be assigned any function thought desirable.

The numeric keys are those for the numbers 0, 1, 2, 3, 4, 5, 6, 7, 8, and 9. They are shown in the cluster of five key rows (four keys each) at the far right of the keyboard. Each key has the number marked on the key itself in FIG. 2. Additionally, two of the numeric keys, those for 0 and 8, are denoted with the number 7 outside the keyboard.

The space bar (5) is shown.

The keyboard of this invention can, for example, be used for word processing or data input. The advantages of the present invention are several. First, the keys are in straight columns as well as straight rows. Therefore one does not have to, as in the QWERTY keyboard, reach a bit to the left when striking a key in the row above the home row and a bit to the right when striking a key in the row below the home row. Second, the keys are laid out in a logical, easy to learn layout. Since most people are right-handed, and since this layout puts all the vowels in position to be typed by the index fingers, the alphabetic sequence begins with the right hand, top row and proceeds in alphabetic sequence from the index finger to the little finger (A-B-C-D) and then to the next (home) row and proceeds from the index finger to the little finger (E-F-G-H) and on to the bottom row nearest the user and proceeds from the index finger to the little finger in the sequence (I-J-K-L). There is a slight break in the alphabetic sequence on the left hand for two reasons. One is to put the infrequently used letter Q in the weakest position for most people (the position where the little finger of the left hand reaches up one row) the other is so that all vowels being typed by the index fingers either on the home row (U,E) or reachable a straight movement up or down from a vowel key of the home row (O,A,I).

The proposed layout should help relieve keyboard operators from repetitive motion injuries because the hands will be separated by the nonalphabetic keys in the center and will thus be in a less straining position.

As Dvorak and Dealy noted, the speed at which one types is largely a function of the speed at which one can type two-letter sequences. The fastest possibilities are when the two keys are both on the home row and are typed with alternate hands. The more one must reach and the more one must type repeatedly with the same hand, and especially with the same finger on different keys, the slower typing becomes. According to Dvorak and Dealy, the twelve most frequently typed two-letter "digraphs" are as follows: TH, HE, OU, AN, ER, IN, RE, ND, HA, TO, YO and AT. These twelve two letter sequences make up over 25% of all typing in the English language. The only two which should be more difficult to type on the proposed keyboard layout than on the Qwerty layout are ND and HA. Seven of the twelve should be quicker and easier and three should be about the same. On this basis, the proposed layout should also be beneficial in making typists faster and reducing the amount of fatigue they experience.

What is claimed is:

1. A computer keyboard comprising 26 alphabetic keys and seven nonalphabetic keys, such that for each of the 26 letters of the alphabet there is one key, such that in a straight first alphabetic key row there are from left to right, in sequence, keys for the letters, Q, M, N, O, and P, a first nonalphabetic key, a second nonalphabetic key, and keys for the letters, A, B, C, and D, such that, in a straight second alphabetic key row closer to the user than the first alphabetic key row and adjacent to the first alphabetic key row, there are from left-to-right, in sequence, keys for the letters, R, S, T, and U, a third nonalphabetic key, a fourth nonalphabetic key, a fifth nonalphabetic key, and keys for the letters, E, F, G, and H, such that, in a straight third alphabetic key row closer to the user than the second alphabetic key row and adjacent to the second alphabetic key row, there are from left to right, in sequence, keys for the letters, V, W, X, Y, and Z, a sixth nonalphabetic key, a seventh nonalphabetic key, and keys for the letters, I, J, K, and L, wherein the first alphabetic key row is parallel to both the second and third alphabetic key rows, wherein said 26 alphabetic keys for letters and seven nonalphabetic keys together are organized in 11 straight columns of three keys each at right angles to the first, second and third alphabetic key rows, wherein the alphabetic keys for the letters Q, R, and V, are aligned in a straight column at right angles to the first key row.

* * * * *